Dec. 17, 1946.  G. ILIFFE  2,412,734
PISTON RING
Filed July 10, 1945
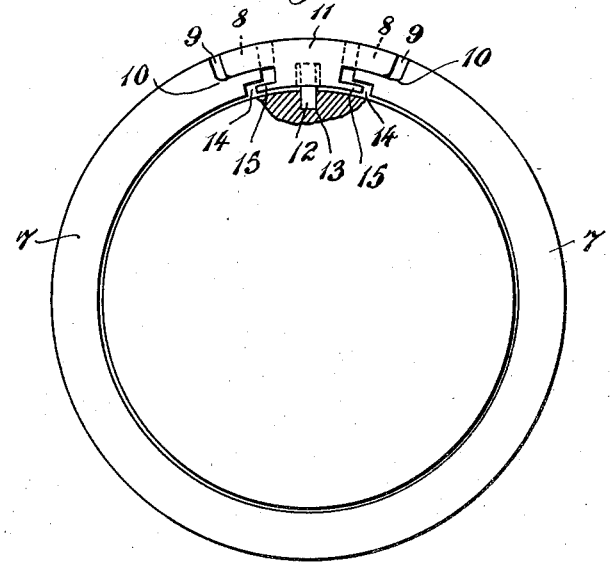
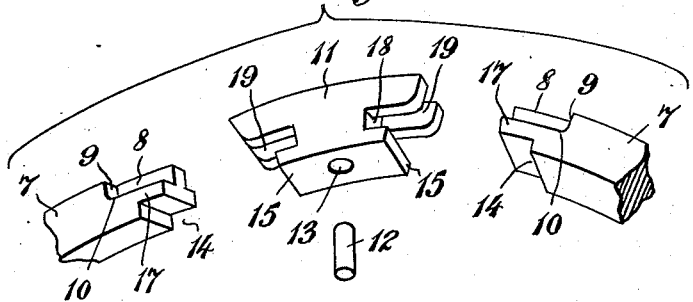
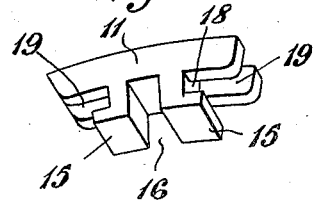
INVENTOR:- G. ILIFFE.
Per:- Norman S. Barlow
Attorney Patented Dec. 17, 1946

2,412,734

UNITED STATES PATENT OFFICE 2,412,734

PISTON RING

George Iliffe, Llandaff, Cardiff, Wales

Application July 10, 1945, Serial No. 604,227
In Great Britain July 19, 1944

1 Claim. (Cl. 309—47)

This invention comprises improvements in or relating to piston rings, piston valve rings and the like of the type in which the ends of the piston ring are adapted to form a joint with a separate segment disposed in the piston ring groove in the piston.

In the beforementioned type of piston ring, when the piston has been withdrawn from the cylinder, the ends of the piston rings disengage the segment, thus necessitating the replacement of the ends into the segment, before the piston can be replaced in the cylinder.

The object of the present invention is to overcome the beforementioned defect, in that the ends of the piston ring will be retained in the segment, when the piston is removed, but at the same time the joint formed by the ends of the ring and the segment will be efficient and freedom of movement will be permitted to the ends of the ring in the segment.

Referring to the drawing:

Figure 1 is a plan of a piston ring and segmental member, according to this invention.

Figure 2 is a perspective view of the piston ring ends and the segmental member, and Figure 3 is a perspective view of a modified form of segmental member.

In carrying the present invention into practice as shown upon the accompanying drawing, the piston ring 7 is formed at its ends with tenons 8, whilst the parts of the piston ring 7 at the two sides of the tenons 8 are cut away to form recesses 9, the inner ends of said recesses 9 being formed to a radius 10.

The two ends of the piston ring 7 make joint with the segmental member 11 which is positioned in the groove of the piston and is located in position by means of the bar 12 which is positioned in an aperture in the bottom of the piston ring groove.

The segmental member 11 has a hole 13 formed therein which fits over the bar 12 to form a floating fit thereon, which permits the segmental member 11 having horizontal and vertical movement in the groove of the piston and moving into contact with the cylinder wall to make the necessary joint therewith.

The tenons 8 of the piston ring are adapted to fit into slots 19 in the segmental member 11.

At the ends of the piston ring 7 and under the tenons 8 are formed steps 14, into which are adapted to fit the projections 15 formed on the segmental member 11, which arrangement provides an abutment against which the recesses 14 in the piston ring abut, whilst the portions 17 of the piston ring fit into the slots 18 of the segmental member 11, thus providing means for retaining the segmental member 11, which is freely mounted on the bar 12 in position in the ends of the piston ring 7, in the event of the piston ring being withdrawn from the cylinder.

In the modification of the segmental member 11 as shown at Figure 3 of the drawing, a slot 16 is provided for accommodating the bar 12.

I claim:

Improvements in piston rings, comprising in combination a segmental member which is adapted to be removably mounted in a piston ring groove, an inwardly projecting recess on each side thereof near its base, vertically disposed slots positioned on each side of said member extending from the top of said member into the inwardly projecting recesses, a piston ring formed at each end on the underside with a cut away portion, and a projecting portion having a tenon on the top of each portion which are adapted to fit into and be complementary with the segmental member, to provide means for preventing the disengagement of the ring from the segmental member.

GEORGE ILIFFE.